United States Patent [19]

Soga et al.

[11] Patent Number: 5,296,263
[45] Date of Patent: Mar. 22, 1994

[54] METHOD OF MANUFACTURING A RECORDING MEDIUM

[75] Inventors: Mamoru Soga, Osaka; Kazufumi Ogawa, Hirakata, both of Japan

[73] Assignee: Matsushita Electric Industrial Co., Ltd., Osaka, Japan

[21] Appl. No.: 2,163

[22] Filed: Jan. 7, 1993

[30] Foreign Application Priority Data

Jan. 7, 1992 [JP] Japan ................................ 4-006163
Apr. 20, 1992 [JP] Japan ................................ 4-099381

[51] Int. Cl.$^5$ ............................................. B05D 5/12
[52] U.S. Cl. ................................. 427/130; 427/128; 427/131; 427/164; 427/209; 427/250; 427/255.6; 427/333
[58] Field of Search ............... 427/164, 128, 131, 130, 427/250, 255.6, 209, 333

[56] References Cited

U.S. PATENT DOCUMENTS 4,429,024 1/1984 Ueno et al. ......................... 428/694
4,761,316 8/1988 Ogawa ................................. 428/64

FOREIGN PATENT DOCUMENTS 87-237700 7/1987 European Pat. Off. .
0282188 9/1988 European Pat. Off. .
0326438 8/1989 European Pat. Off. .
60-223027 11/1985 Japan .

Primary Examiner—Bernard Pianalto
Attorney, Agent, or Firm—Fish & Richardson

[57] ABSTRACT

The invention is to a method of manufacturing a recording medium, such as an optical information recording medium and a magnetic recording medium. By providing the surface of an optical information recording medium with a chemical adsorption film containing an alkyl fluoride through a siloxane coupling, a recording medium excelling in humidity resistance and corrosion resistance is obtained. By providing the surface of a magnetic recording medium with a chemical adsorption film containing an alkyl fluoride through siloxane coupling, a recording medium excelling in lubricity, durability, running performance and wear resistance may be obtained. Employing the vapor phase process, a plastic substrate may be used, and the formation of pin holes may be prevented.

11 Claims, 14 Drawing Sheets

A : Transmissivity transition curve of Examples 1 to 4
B : Transmissivity transition curve of Comparative Ex. 1
C : Transmissivity transition curve of Comparative Ex. 2
D : Transmissivity transition curve of Comparative Ex. 3
E : Transmissivity transition curve of Comparative Ex. 4

F : Transmissivity transition curve of Examples 5 to 9
G : Transmissivity transition curve of Comparative Ex. 5

METHOD OF MANUFACTURING A RECORDING MEDIUM

FIELD OF THE INVENTION

The present invention relates to a method of a manufacturing a recording medium such as an optical information recording medium, i.e., an optical disk, video disk or a digital audio disk, and a magnetic recording medium of high recording density which is used in the information industries.

BACKGROUND OF THE INVENTION

Optical information recording media for forming a recording medium on one side of a transparent substrate using light energy, and recording and reproducing using laser beams on the substrate side have been recently developed. Not only materials for a recording layer have been developed, but also protective films for preventing the recording layer from deteriorating due to moisture or oxygen have been developed (Japanese Laid-open Patent SHO. 59-68850/1984).

The protective layer is typically composed of a material having low moisture permeability, which may include, as inorganic matter, oxide films such as $SiO_2$, MgO, $Al_2O_3$. Examples of organic matter may be polypropylene, ethylene-vinyl acetate copolymer, and polyvinylidene chloride.

In an optical information recording medium, protection from moisture is explained below.

First, to prevent invasion of moisture through the substrate, oxides or fluorides are formed on the surface of the substrate. These inorganic materials are generally low in moisture permeability, and if the optical information recording medium is left in a high humidity atmosphere, corrosion of the recording medium may be prevented to a certain extent. Instead of these inorganic materials, similarly, by using organic high polymers relatively low in moisture permeability, such as polyvinylidene chloride, corrosion of the recording layer may be prevented. Moreover, as an organic high polymer protective film, crosslinking type resins such as epoxy resin are proposed (Japanese Laid-open Patent SHO. 57-70694/1982).

Such protective films, however, involve the following problems.

(1) Inorganic materials such as oxides and fluorides weakly adhere to the transparent substrate, and peeling or cracking may occur if left at a high temperature, high humidity condition.

(2) Oxides and fluorides do not readily form dense thin films.

(3) In organic high polymer materials, moisture barrier performance is limited although moisture permeability is low, and the moisture-proof effect is lost when stored for a long time under high temperature, high humidity conditions.

(4) When storing for a long time under high temperature, high humidity conditions, the crosslinking type resin is porous and is high in moisture permeability, and the recording layer is likely to deteriorate due to moisture.

Due to these reasons, when the optical information recording medium is stored under high temperature, high humidity conditions, the recording layer may corrode and deteriorate.

Instead of the conventional coating type magnetic recording medium, the magnetic recording medium forming a ferromagnetic metal thin film on a nonmagnetic support using a plating, sputtering, vacuum deposition, or ion plating method is being presently studied for use as a high density magnetic recording medium.

However, the magnetic recording medium using the ferromagnetic metal thin film fabricated in the above methods has its problems in wear resistance and running performance. That is, in the recording and reproducing process of a magnetic signal, the magnetic recording medium is set in a state of high speed relative motion against the magnetic head. At this time, running of the magnetic recording medium must be smooth and stable.

The ferromagnetic metal thin film fabricated in such methods, however, cannot withstand the rugged conditions in the process of magnetic recording or reproduction, and running becomes unstable due to wear of the magnetic head. Output may be significantly lowered in the course of running for a long time due to wear, tear or worn chips. It is accordingly proposed to form a monomolecular film composed of saturated fatty acid or its metal salt on the ferromagnetic metal thin film (Japanese Laid-open Patent SHO. 50-75001/1975).

In this case, although the initial lubricity is somewhat improved, the lubricity is not durable, and running stability and wear resistance are not sufficient. This is because the bonding of the monomolecular film of the saturated fatty acid and the ferromagnetic metal thin film is relatively weak, since the bonding is by physical adsorption, and the saturated fatty acid is shaved off by the sliding magnetic head or the like during running. To improve this point, it is known to form a protective film by coating the surface of the magnetic recording layer with a silane chemical adsorption film (U.S. Pat. No. 4,992,300).

In this known art, however, since the chemical adsorption film is formed by a liquid phase method using a chemical solvent, the substrate may be dissolved or swollen depending on the type of solvent. Another problem is peeling of the recording layer. Moreover, due to dust or contamination in the solvent, pin holes are likely to occur.

SUMMARY OF THE INVENTION

It is hence a primary object of the invention to solve the problems of the prior art by presenting a method of preventing formation of pin holes without injuring the substrate or recording layer by performing chemical adsorption using a vapor phase method.

An object of the invention is to provide a method of manufacturing a recording medium having a recording layer on a surface of a plastic substrate, comprising contacting a halogenated silane chemical adsorbent with the surface of the plastic substrate or the surface of the recording layer under vapor phase to induce a dehydrochlorination reaction, and reacting with moisture to form a chemical adsorption film.

It is preferable in this invention that the recording medium is an optical information recording medium or a magnetic recording medium.

It is preferable in this invention that the chemical adsorption film is formed under a vapor phase on the surface of a transparent plastic substrate to form an optical information recording layer.

It is preferable in this invention that the inorganic oxide layer is formed on the surface of an optical information recording layer which is formed on one side of the plastic substrate, and a chemical adsorption film is formed on the surface of the inorganic oxide layer, or on both surfaces of the inorganic oxide layer and transparent substrate in vapor phase.

It is preferable in this invention that the chemical adsorbent is a compound containing a fluorocarbon group.

It is preferable in this invention that the chemical adsorption film is a monomolecular film.

It is preferable in this invention that the inorganic oxide film is at least one layer selected from the group consisting of $SiO_2$, $TiO_2$, and $Al_2O_3$.

It is preferable in this invention that the thickness of the inorganic oxide film is 1 to 500 nm.

It is preferable in this invention that the ferromagnetic metal thin film is on the plastic substrate or plastic film, and a chemical adsorption film is formed on at least one of the ferromagnetic metal thin film or the back side of the substrate under vapor phase.

It is preferable in this invention that the ferromagnetic metal thin film is on the plastic substrate or plastic film, an inorganic oxide layer is formed on the ferromagnetic metal thin film, and a chemical adsorption film is formed on at least one of the inorganic oxide layer or the back side of the substrate under a vapor phase.

It is preferable in this invention that the thickness of the inorganic oxide layer is 1 to 50 nm.

According to the manufacturing method of the invention, the chemical adsorption film formed on the outer surface of a transparent substrate which forms an optical information recording layer is dense, hardly forms cracks, and scarcely passes water molecules. Since a chemical bond is achieved through siloxane coupling between the chemical adsorption film and the inorganic oxide layer or transparent substrate, it does not peel off. Hence, the recording medium obtained by the method of the invention is excellent in moisture proof quality and corrosion resistance.

Moreover, since the chemical adsorption film is formed under a vapor phase, it can be used in a substrate which is soluble in an organic solvent.

According to a preferred embodiment of the invention in which the chemical adsorbent contains an alkyl fluoride group, the moisture proof quality and corrosion resistance may be further improved by making use of the water repelling property of fluorine.

According to a preferred embodiment of the invention in which the chemical adsorption film is a monomolecular film, a very thin, transparent, excellently protective film may be formed.

In another preferred embodiment of the invention in which the inorganic oxide film layer contains at least one member selected from the group consisting of $SiO_2$, $TiO_2$, and $Al_2O_3$, such inorganic oxide layers also present a moisture proof quality and corrosion resistance, so that a superior moisture proof quality and corrosion resistance may be attained. In particular, in the case of a $SiO_2$ layer, since the density of a siloxane coupling may be enhanced, a dense chemical adsorption film may be formed.

In another preferred embodiment of the invention in which the transparent substrate is made of a resin, an easy-to-handle recording medium may be presented in the optical information recording medium.

According to the above manufacturing method of the invention, since the chemical adsorption film which is disposed on at least on the ferromagnetic metal thin film or on the back side of the substrate, is chemically bonded with the ferromagnetic metal thin film or substrate through siloxane coupling. The chemical adsorption film will not be shaved off by friction with the magnetic head or other members making contact while running, so that the magnetic recording medium is excellent in lubricity, durability, running performance and wear resistance.

Since the chemical adsorption film is formed under a vapor phase, a substrate which is soluble in an organic solvent may also be used. This is because an organic solvent is not used.

In a further preferred embodiment of the invention in which the chemical adsorption film contains an alkyl fluoride group, the lubricity and running performance may be further enhanced by making use of the low surface energy properties of the fluorine compound.

In a different preferred embodiment of the invention in which the inorganic oxide film layer is a layer selected at least from the group consisting of $SiO_2$, $TiO_2$, and $Al_2O_3$, such inorganic oxide layers also present a moisture proof quality and corrosion resistance, so that a superior moisture proof quality and corrosion resistance may be attained. In particular, in the case of a $SiO_2$ layer, since the density of a siloxane coupling may be enhanced, a dense chemical adsorption film may be formed.

DETAILED DESCRIPTION OF THE INVENTION

The invention is intended to present a method of manufacturing a recording medium such as an optical information recording medium and a magnetic recording medium. By providing the surface of an optical information recording medium with a chemical adsorption film containing alkyl fluoride through a siloxane coupling, a recording medium excelling in humidity resistance and corrosion resistance is obtained. By providing the surface of magnetic recording medium with a chemical adsorption film containing alkyl fluoride through a siloxane coupling, a recording medium excelling in lubricity, durability, running performance and wear resistance may be obtained. Employing the vapor phase process, a plastic substrate may be used, and formation of pin holes may be prevented.

Figure 1:
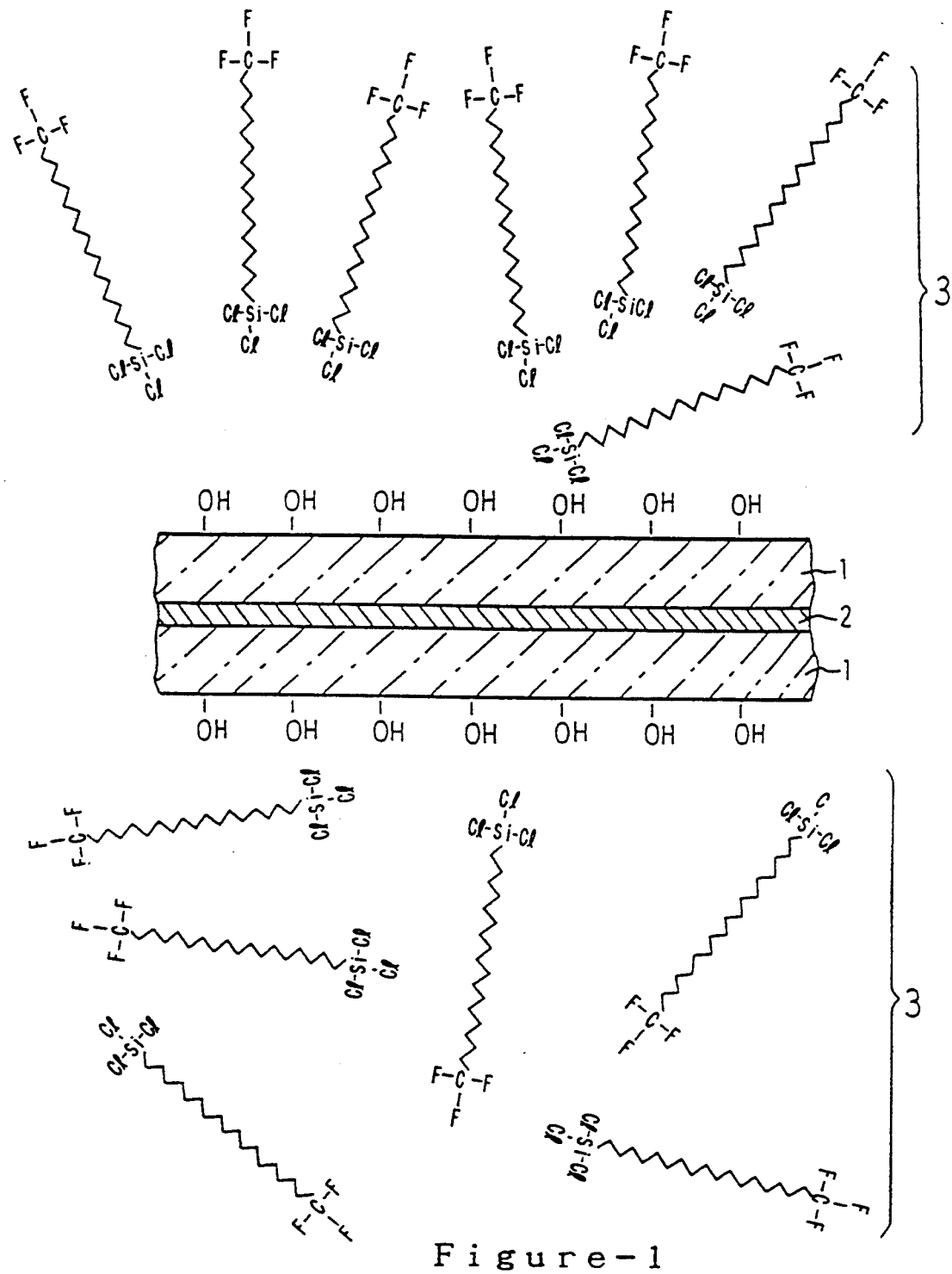
FIG. 1 is a sectional diagram showing an embodiment of the invention at the molecular level, just before the chemical adsorption reaction.
Figure 2:
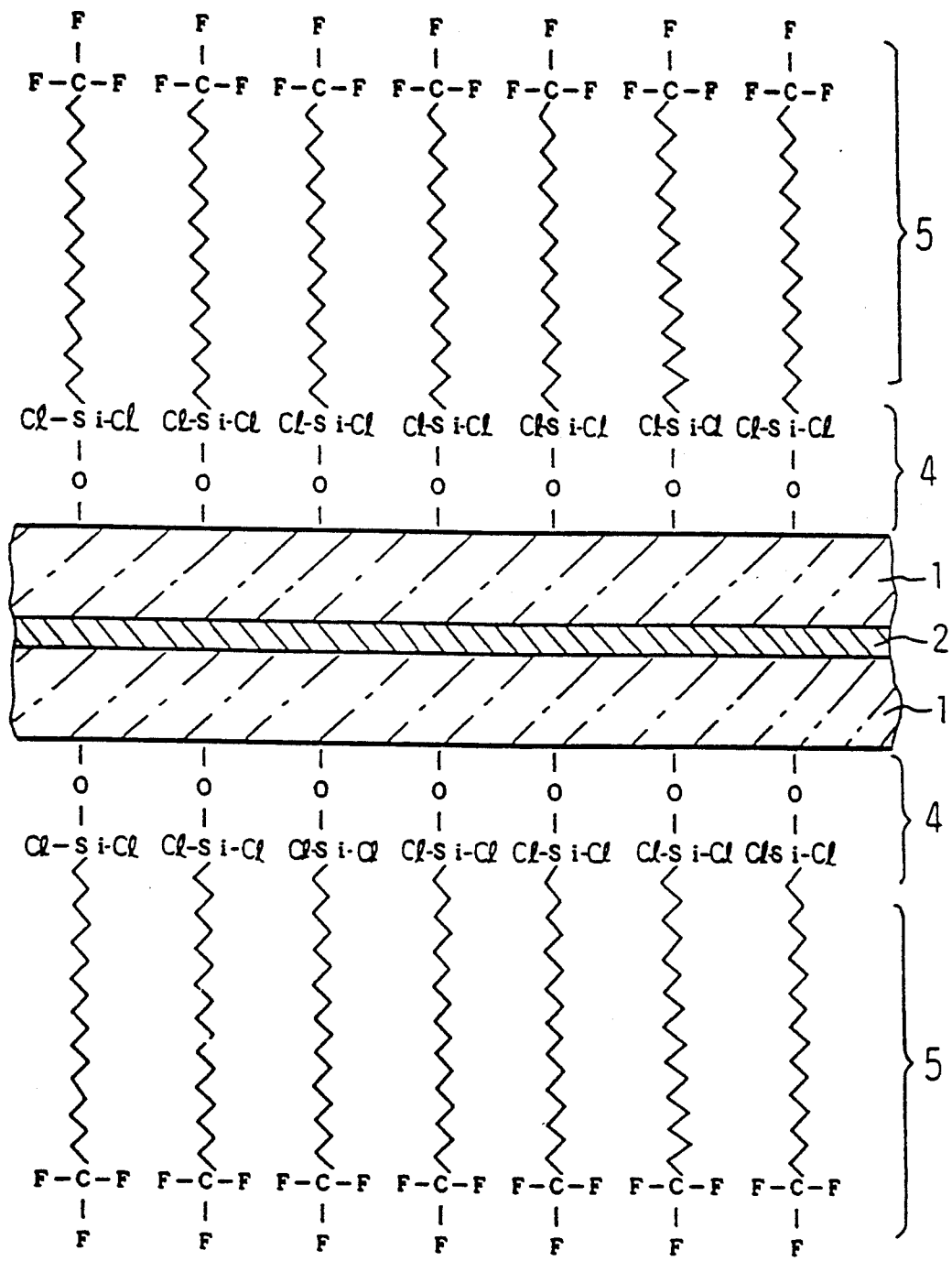
FIG. 2 is a sectional diagram showing an embodiment of the invention at the molecular level, just after the chemical adsorption reaction.
Figure 3:
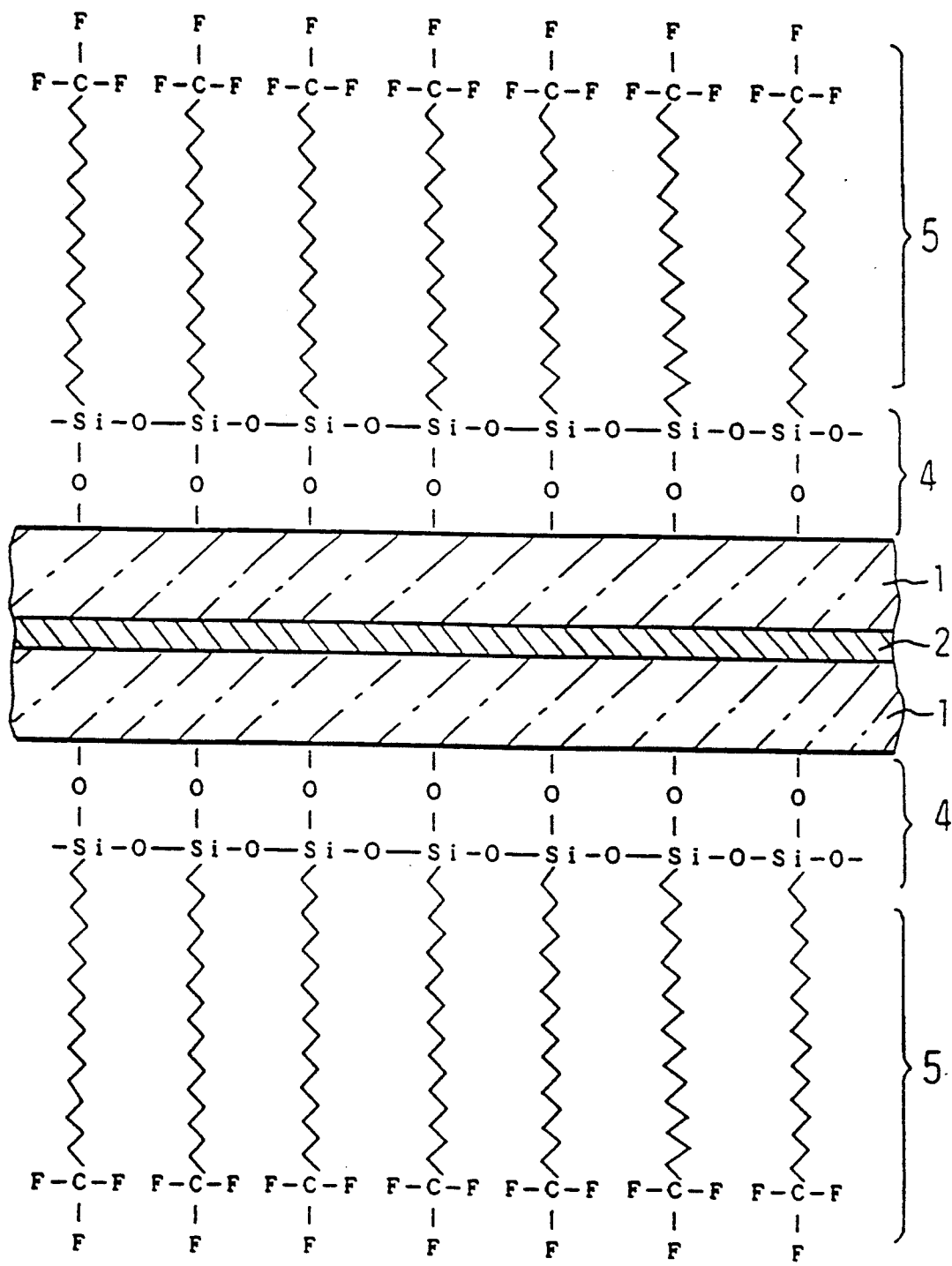
FIG. 3 is a sectional diagram showing an embodiment of the invention at the molecular level, after reaction with moisture.

Referring now to the drawings, some of the embodiments of the invention are described in detail below. FIG. 1 through FIG. 3 show a method of manufacturing a recording medium according to an embodiment of the invention.

In FIGS. 1 to 3, numeral 1 denotes a transparent substrate, 2 is an optical information recording medium, 3 is a chlorosilane surfactant, 4 is a siloxane coupling, and 5 is a chemical adsorption film. When the transparent substrate 1, forming the optical information recording medium 2, is exposed to the vapor of the chlorosilane surfactant 3 (FIG. 1), the hydroxyl groups of the substrate surface and the chlorosilane surfactant react to dehydrochlorinate, and the chemical adsorption film 5 is formed through the siloxane coupling 4 (FIG. 2). When left standing in air, consequently, it reacts with moisture in the air to form the siloxane coupling 4, also between adsorption molecules (FIG. 3).

Figure 5:
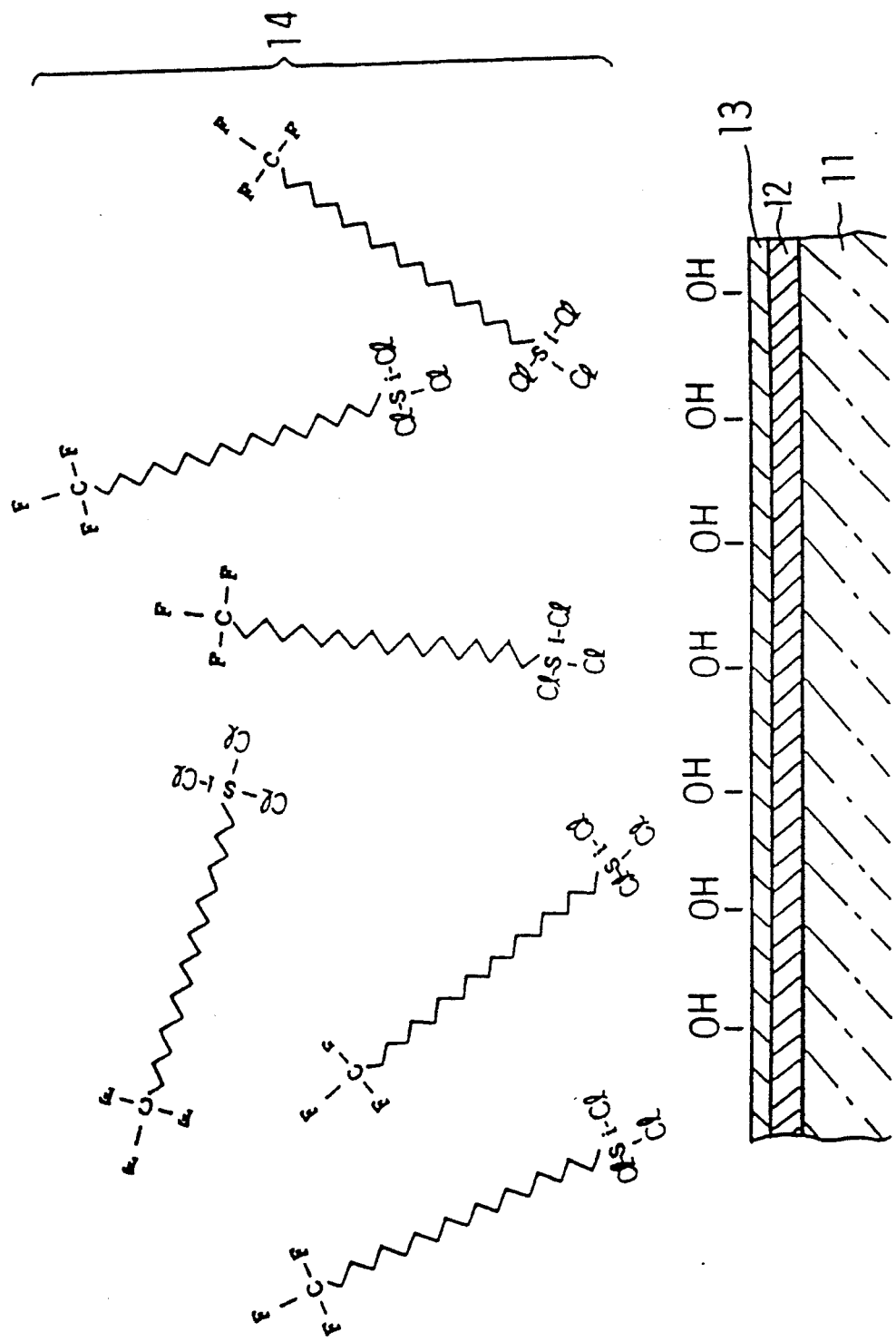
FIG. 5 is a sectional diagram showing an embodiment of the invention at the molecular level, just before the chemical adsorption reaction.
Figure 6:
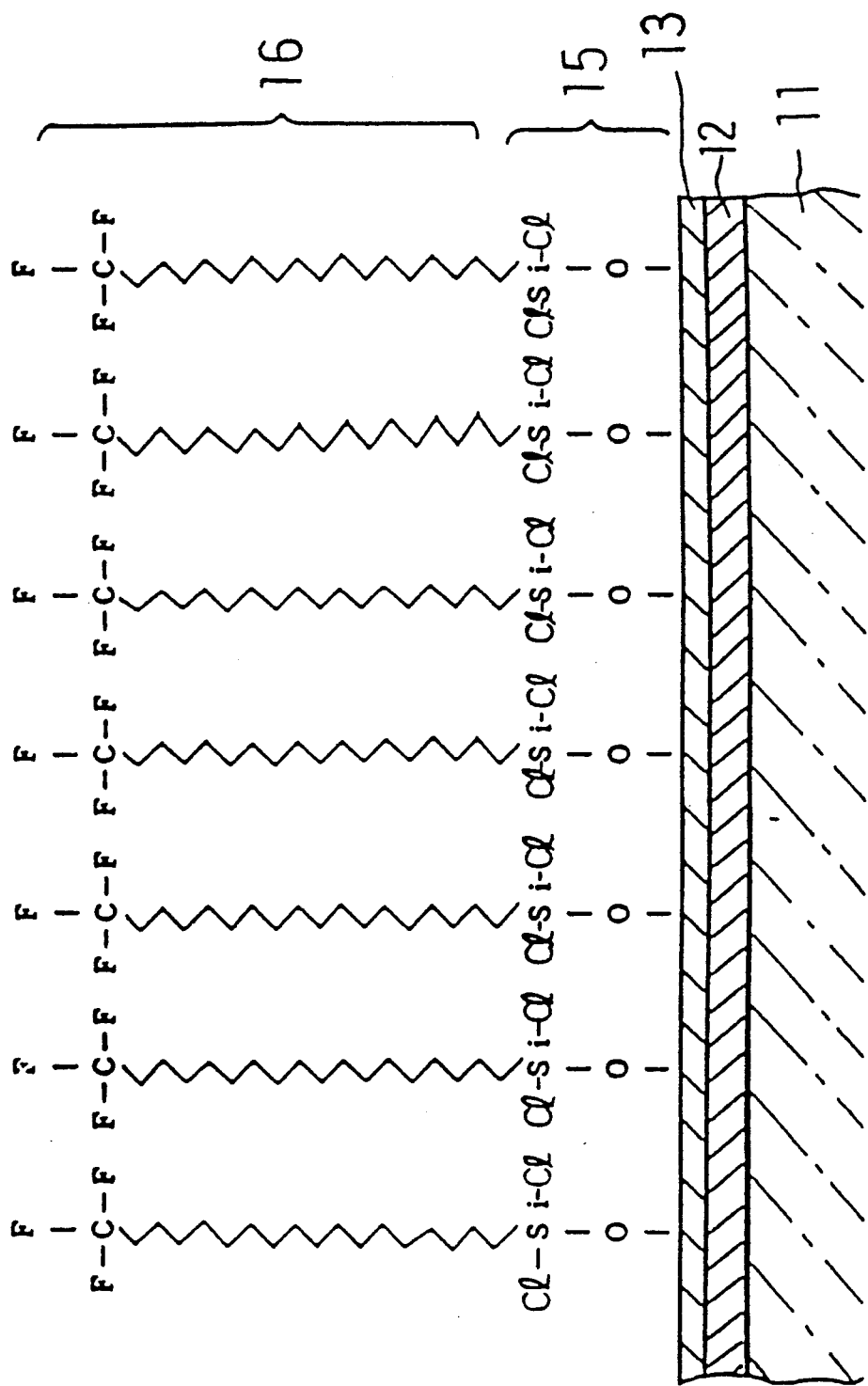
FIG. 6 is a sectional diagram showing an embodiment of the invention at the molecular level, just after the chemical adsorption reaction.
Figure 7:
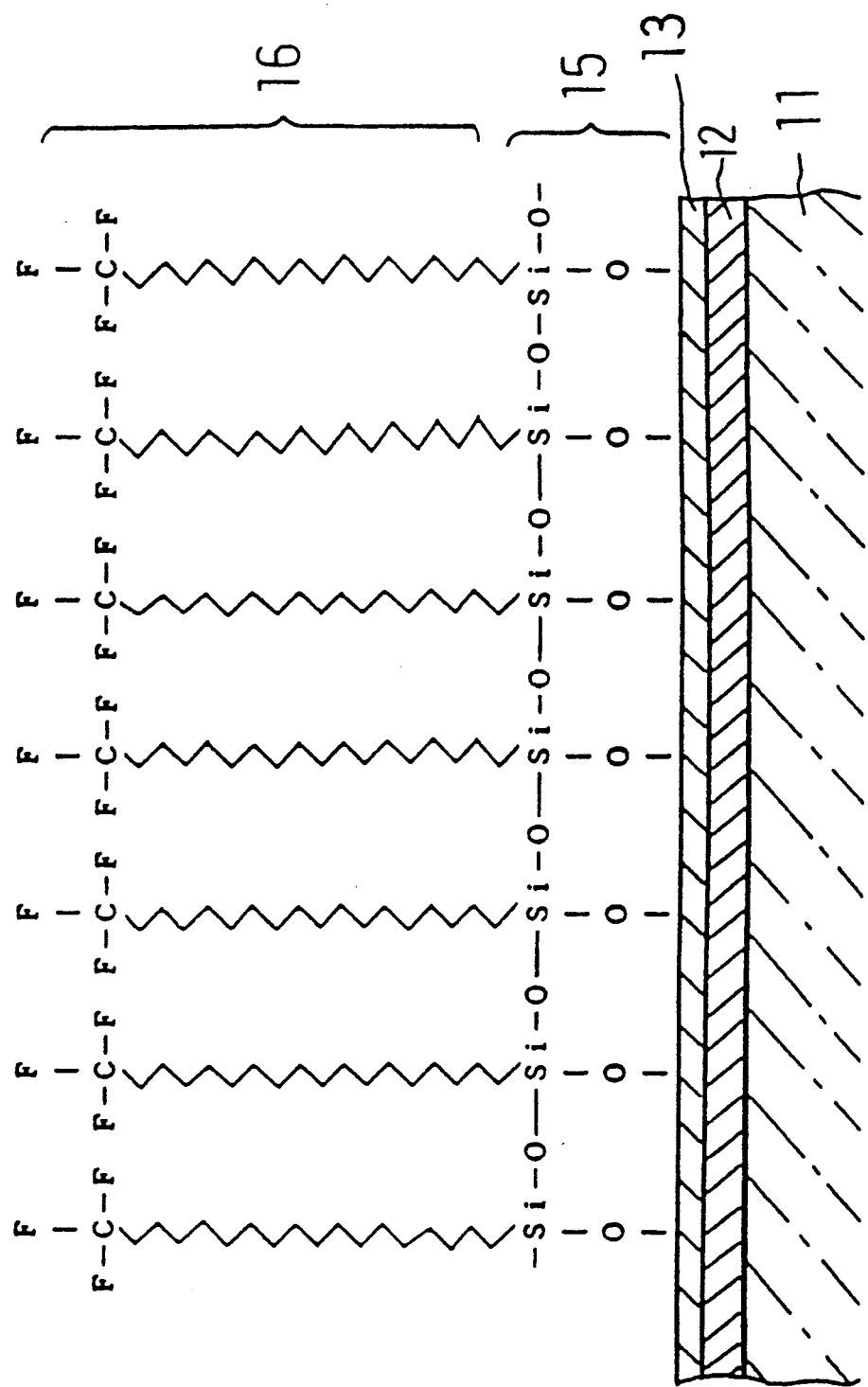
FIG. 7 is a sectional diagram showing an embodiment of the invention at the molecular level, after reacting with moisture.

FIG. 5 and FIG. 6 are sectional views of the optical information recording medium in an embodiment of the invention. In FIG. 5 to FIG. 7, numeral 11 denotes a transparent substrate, 12 is an optical information recording medium, 13 is an inorganic oxide layer, 14 is a chlorosilane surfactant, 15 is a siloxane coupling, and 16 is a chemical adsorption film. When the transparent substrate 11 which forms the optical information recording medium 12 is exposed to the vapor of the chlorosilane surfactant 14, the hydroxyl groups of the substrate surface and the chlorosilane surfactant react to dehydrochlorinate, and the chemical adsorption film 16 is formed through the siloxane coupling 15. When left standing in the air, consequently, it reacts with moisture in the air to form the siloxane coupling 4 also between adsorption molecules.

Examples of the transparent substrates 1, 11 usable in the invention include polycarbonate and acrylic resin, among others.

As the inorganic oxide film 13, $SiO_2$, $TiO_2$, and $Al_2O_3$ are preferable from the viewpoint of transparency. In particular, in the case of $SiO_2$, same as in an ordinary glass substrate, since the hydroxyl groups are present on the surface at a high density, the chlorosilane surfactant may be formed at a high density without pretreating with tetrachlorosilane.

The inorganic oxide film 13 may be formed by, for example, a sputtering method or a vacuum deposition method.

When forming the inorganic oxide film 13 on the optical information recording layer 12 according to the invention, the film thickness is preferably 1 to 500 nm. If the film thickness is more than 500 nm, peeling or cracking may be likely to be formed. If less than 1 nm, pin holes are likely to occur, thereby making it difficult to form the chemical adsorption film.

In the optical information recording medium of the invention, as the material for composing the chemical adsorption films 5, 16, for example, a chlorosilane surfactant possessing an alkyl fluoride group of fluorocarbon group may be used.

Examples of trichlorosilane-based surface active materials of the present invention include

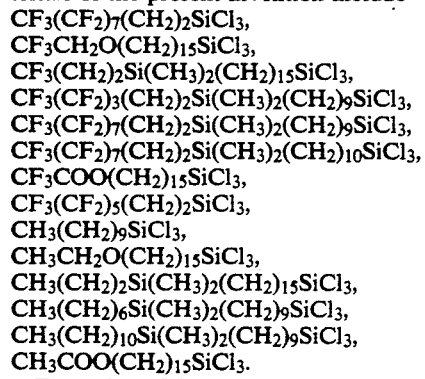

Examples of lower-alkyl substituted monochlorosilane- or dichlorosilane-based surface active materials of the present invention include

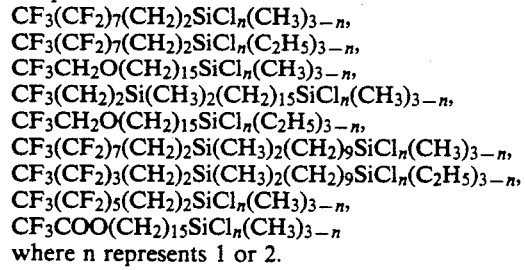

where n represents 1 or 2.

Among these examples, trichlorosilane-based surface active materials are preferred in that chlorosilyl bonds other than those bonded to their hydrophilic groups form inter-molecular bonds with adjacent chlorosilane groups by siloxane bonds, thereby permitting formation of a more firmly adsorbed film.

Trichlorosilane-based surface active materials are particularly preferred because chlorosilyl bonds other than those coupled to their hydrophilic groups form inter-molecular bonds with adjacent chlorosilane groups with siloxane bonds and thus permit formation of a more firmly adsorbed film.

Further, $CF_3(CF_2)_n(CH_2)_2SiCl_3$ where n represents an integer, most suitably 3 to 25, is preferred because of its water-repelling, anti-contaminating and other functional properties. Further, with an ethylene or acetylene group added to or incorporated in the alkyl fluoride chain portion, the chemically adsorbed film may be crosslinked after formation by irradiating it with an electron beam of about 5 Mrads, further improving the hardness of the chemically adsorbed film.

It is thus possible to further improve the hardness of the chemically adsorbed film.

The chlorosilane-based surface active material according to the invention is not limited to those in the form of a straight chain as noted above. It is possible to use a branched fluorocarbon or hydrocarbon group or those having a substituted fluorocarbon or hydrocarbon group with a —Si— bond at one end (i.e., those represented by the formula $R_2SiCl_2$, $R_3SiCl$, $R^1R^2SiCl_2$ or $R^1R^2R^3SiCl$ where R, $R^1$, $R^2$ and $R^3$ represents an fluorocarbon group or hydrocarbon group). To increase the adsorption density, however, the straight chain form is preferred.

Further, by chemically adsorbing a material for forming an inner layer material having a plurality of chlorosilyl groups, e.g., $SiCl_4$, $SiHCl_3$, $SiH_2Cl_2$, and $Cl(SiCl_2O)_nCl_3$ (where n represents an integer in a range from 1 to 20), $SiCl_m(CH_3)_{4-m}$, $SiCl_m(C_2H_5)_{4-m}$ (where m represents 1, 2 or 3), and $HSiCl_p(CH_3)_{3-p}$, $HSiCl_p(C_2H_5)_{3-p}$ (where p represents 1 or 2), and then reacting it with water, surface chlorosilyl bonds are converted to hydrophilic silanol bonds, thus making the polymer composition hydrophilic. Among the materials containing a plurality of chlorosilyl groups, tetrachlorosilane ($SiCl_4$) is preferred in that it is highly reactive and low in molecular weight. It can, therefore, provide silanol bonds at a high density. In this way, it is possible to provide a highly hydrophilic composition compared to oxidation treatment of a polymer-containing substrate. To this surface, a chlorosilane-based surface active material containing fluorocarbon groups may be chemically adsorbed. In this way, a chemically adsorbed film suitably having an increased density can be obtained.

When the hydrophilic group density is increased in this way, the hydroxyl group density may be higher than in an oxidation treatment of transparent substrate. Thereon, for example, a chlorosilane surfactant containing an alkyl fluoride group may be further chemically adsorbed. The chemical adsorption film obtained in this manner is higher in density, and the moisture proof quality and corrosion resistance may be further enhanced, or lubricity, durability, running performance, and wear resistance may be further improved.

As a means of oxidizing the surface of the transparent substrate, ordinary methods may be applied. For example, oxygen plasma processing and the corona process may be used.

As the chemical adsorption film formed on the recording medium surface of the invention, a sufficient function is exhibited using only one layer of the monomolecular chemical adsorption film. The chemical adsorption film may be also formed by accumulation of monomolecular films. When the chemical adsorption film forms cumulative films, groups presenting given functions are oriented, and density is enhanced, so that higher functions may be exhibited.

Hereinafter, using $CF_3(CF_2)_nCH_2CH_2SiCl_3$ as an example of the chemical adsorbent, the reaction process of the invention is described. In a container or tank, a transparent substrate possessing hydroxyl groups (—OH) on its surface or a nonmagnetic substrate forming a ferromagnetic metal thin film layer is placed. Its surface is brought into contact with the chemical adsorbent gas under a vapor phase, then the reaction occurs as shown in formula [1].

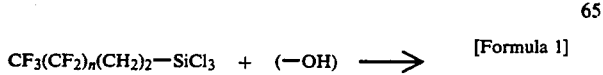
[Formula 1]

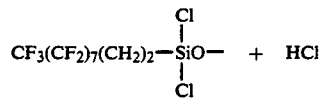

Exhausting the gas of the chemical adsorbent, when gas containing moisture (or atmosphere) is introduced, the reaction occurs as shown in formula [2].

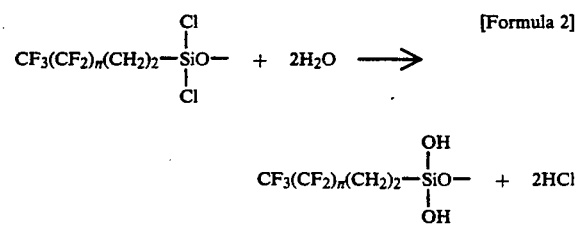

When the transparent substrate is exposed to air or left standing, the reaction of formula [3] occurs, and a chemical adsorption monomolecular film is formed.

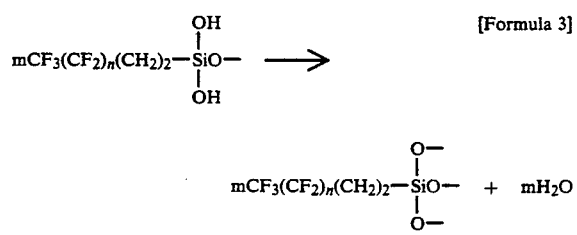

The invention is described in further details below by referring to some of the practical embodiments thereof.

EXAMPLE 1

On one side of a polycarbonate substrate 1 of 1.2 mm in thickness and 120 mm in diameter, an optical information recording layer 2 mainly composed of Te, $TeO_2$ was formed by vacuum deposition, and a same one as the polycarbonate substrate 1 was adhered further thereon by using a UV curing type adhesive. Using the prepared disk, the surface was oxidized in a UV dry stripper (UV-1, manufactured by Samco International) by treating with oxygen plasma for 10 minutes at an oxygen flow rate of 1 liter/min, and was exposed for 120 minutes to heptadecafluorodecyl trichlorosilane vapor as a chlorosilane surfactant containing an alkyl fluoride group in a desiccator. A chemical adsorption monomolecular film 5 was formed on the surface of the polycarbonate substrate 1 through a siloxane coupling 4 containing an alkyl fluoride group. In succession, by letting stand for 60 minutes in the air, a siloxane coupling 4 was formed also among adsorption molecules.

EXAMPLE 2

A coated substrate was formed as in Example 1, except that heptadecafluorodecyl trichlorosilane was replaced by tridecafluorooctyl trichlorosilane.

EXAMPLE 3

A coated substrate was formed as in Example 1, except that heptadecafluorodecyl trichlorosilane was replaced by perfluorododecyl trichlorosilane.

EXAMPLE 4

A coated substrate was formed as in Example 1, except that the oxygen plasma process was first followed by exposure to tetrachlorosilane vapor for 60 minutes, and then left standing in air for 60 minutes.

COMPARATIVE EXAMPLE 1

Instead of forming the chemical adsorption film on the transparent substrate in Example 1, a 150 nm silicon nitride film was formed by plasma CVD (chemical vapor deposite) method.

COMPARATIVE EXAMPLE 2

Instead of forming the chemical adsorption film on the transparent substrate in Example 1, a 150 nm $SiO_2$ film was formed by vacuum deposition method.

COMPARATIVE EXAMPLE 3

Instead of forming the chemical adsorption film on the transparent substrate in Example 1, a 150 nm ethylene-vinyl acetate copolymer was formed.

COMPARATIVE EXAMPLE 4

Without protective film

Figure 4:
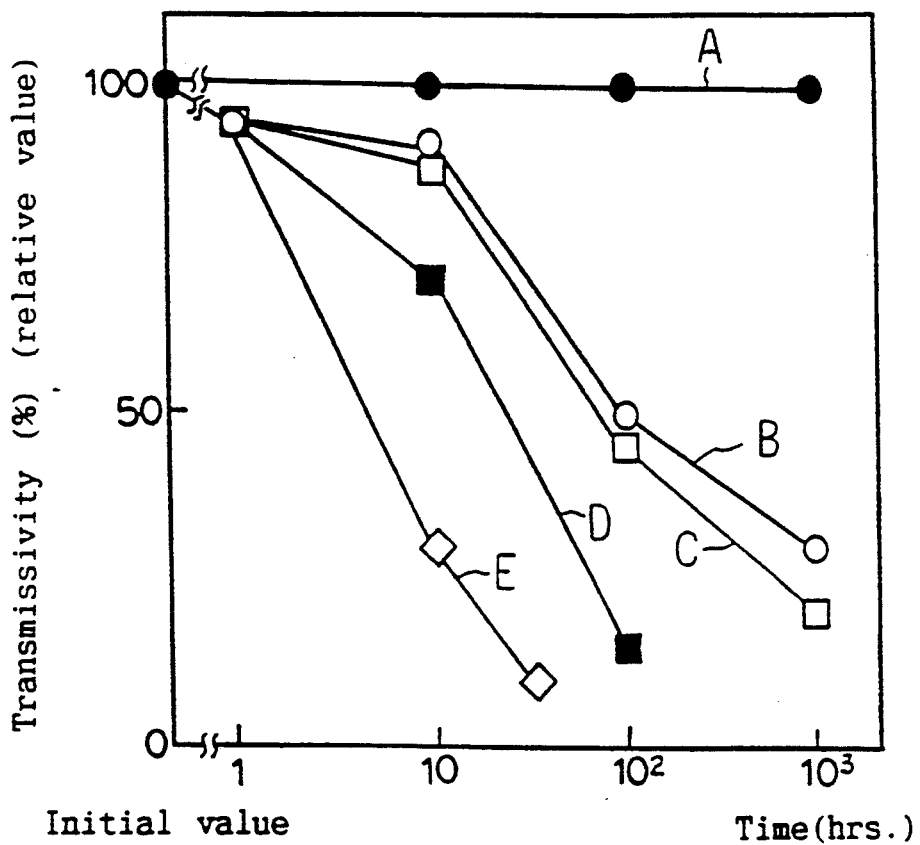
FIG. 4 is a diagram showing transmittance changes of light (830 nm) at 70° C., 80% RH conditions in an embodiment of the invention and a reference example.

These samples were left standing in the conditions of 70° C., and 80% RH. The transitional changes of light (832 nm) transmissivity were measured. The results are shown in FIG. 4. In FIG. 4, curve A relates to Examples 1 to 4, B to Comparison 1, C to Comparison 2, D to Comparative example 3, and E to Comparative example 4, individually showing time-course changes of transmissivity.

As is clear from FIG. 4, in all recording media of the embodiments of the invention, the transmittance was hardly changed after 1,000 hours, and the recording films were found to be stable without corroding or deteriorating in the high temperature, high humidity conditions. By contrast, in the comparison samples, in 10 to 100 hours, the recording films corroded and deteriorated due to peeling of protective film, cracking, or the like, and transmittance was notably lowered.

EXAMPLE 5

On one side of a polycarbonate substrate 1 of 1.2 mm in thickness and 120 mm in diameter, an optical information recording layer 12 mainly composed of Te, $TeO_2$ was formed by vacuum deposition. A $SiO_2$ film having a thickness of 10 nm was formed further thereon as an inorganic oxide film 13 by the sputtering method. Using the prepared disk, the surface was oxidized in a UV dry stripper (UV-1, manufactured by Samco International) by treating with oxygen plasma for 10 minutes at an oxygen flow rate of 1 liter/min, and was exposed for 120 minutes to heptadecafluorodecyl trichlorosilane vapor as a chlorosilane surfactant containing alkyl fluoride group in a desiccator. A chemical adsorption monomolecular film 16 was formed on the surface of the $SiO_2$ layer 13 and the surface of the polycarbonate substrate 11 through a siloxane coupling 15 containing an alkyl fluoride group. In succession, by letting stand for 60 minutes in the air, a siloxane coupling 15 was formed also among adsorption molecules.

EXAMPLE 6

A coated substrate was formed as in Example 5, except that the inorganic oxide layer was changed from $SiO_2$ to $TiO_2$.

EXAMPLE 7

A coated substrate was formed as in Example 5, except that the inorganic oxide layer was changed from $SiO_2$ to $Al_2O_3$.

EXAMPLE 8

A coated substrate was formed as in Example 5, except that the oxygen plasma processing was first followed by exposure tetrachlorosilane vapor for 60 minutes, then left standing in the air for 60 minutes.

EXAMPLE 9

A coated substrate was formed as in Example 5, except that heptadecafluorodecyl trichlorosilane was replaced by 9-(heptadecafluorodecyl dimethylsilylnonyltoily chlorosilane.

COMPARATIVE EXAMPLE 5

A sample was prepared according to Example 5, without forming a chemical adsorption film.

Figure 8:
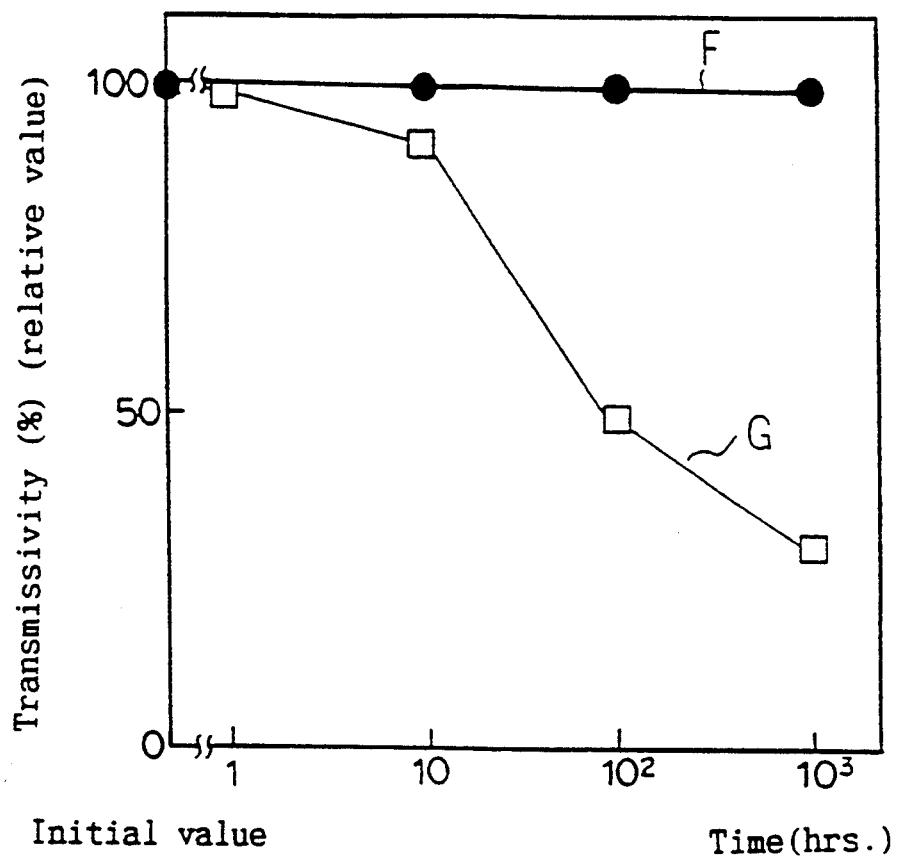
FIG. 8 is a diagram showing transmittance changes of light (830 nm) at 70° C., 80% RH conditions in an embodiment of the invention and a reference example.

These samples were left standing at 70° C., at 80% RH. The transmittance changes of light (832 nm) were measured. The results are shown in FIG. 8. In FIG. 8, curve F shows the time-course changes of transmittance of Examples 5 to 9, and curve G those of Comparative example 5.

As is clear from FIG. 8, in all recording media of the embodiments of the invention, the transmittance was hardly changed after 1,000 hours, and the recording films were found to be stable without corroding or deteriorating in the high temperature, high humidity conditions. By contrast, in the comparison sample, in 10 to 100 hours, the recording film corroded and deteriorated due to peeling of protective film, cracking, or the like, and transmittance was notably lowered.

In the embodiments, meanwhile, as the optical information recording layer, the recording film of Te, $TeO_2$ compound is explained, but it is not limiting, and the same effects are expected by using other optical information recording films such as Tb-Fe-Co and Al compound films.

Thus, according to the invention, by disposing the chemical adsorption film possessing a siloxane coupling on the outer surface of the transparent substrate having the optical information recording layer formed inside by the vapor phase method, a moisture proof quality and corrosion resistance may be enhanced without deteriorating the substrate, of which practical effects are outstanding.

Moreover, by forming the inorganic oxide layer on the optical information recording layer formed on one side of the transparent substrate, and disposing the chemical adsorption film possessing the siloxane coupling on the surface of the inorganic oxide layer on both surfaces of the inorganic oxide layer and transparent substrate by the vapor phase method, a moisture proof quality and corrosion resistance may be enhanced without deteriorating the substrate, of which practical effects are outstanding.

Figure 9:
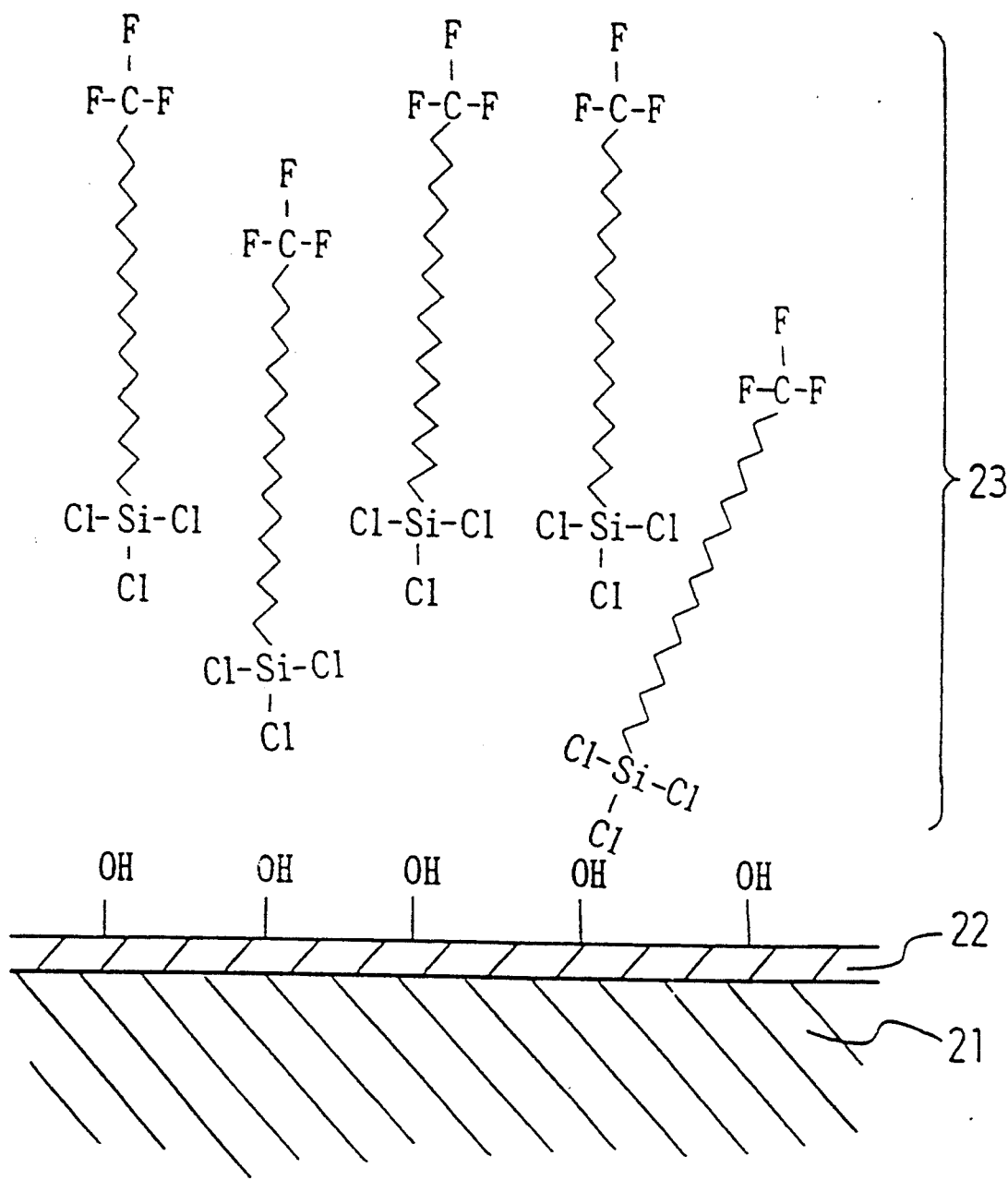
FIG. 9 is a sectional diagram showing an embodiment of the invention at the molecular level, just before the chemical adsorption reaction.
Figure 10:
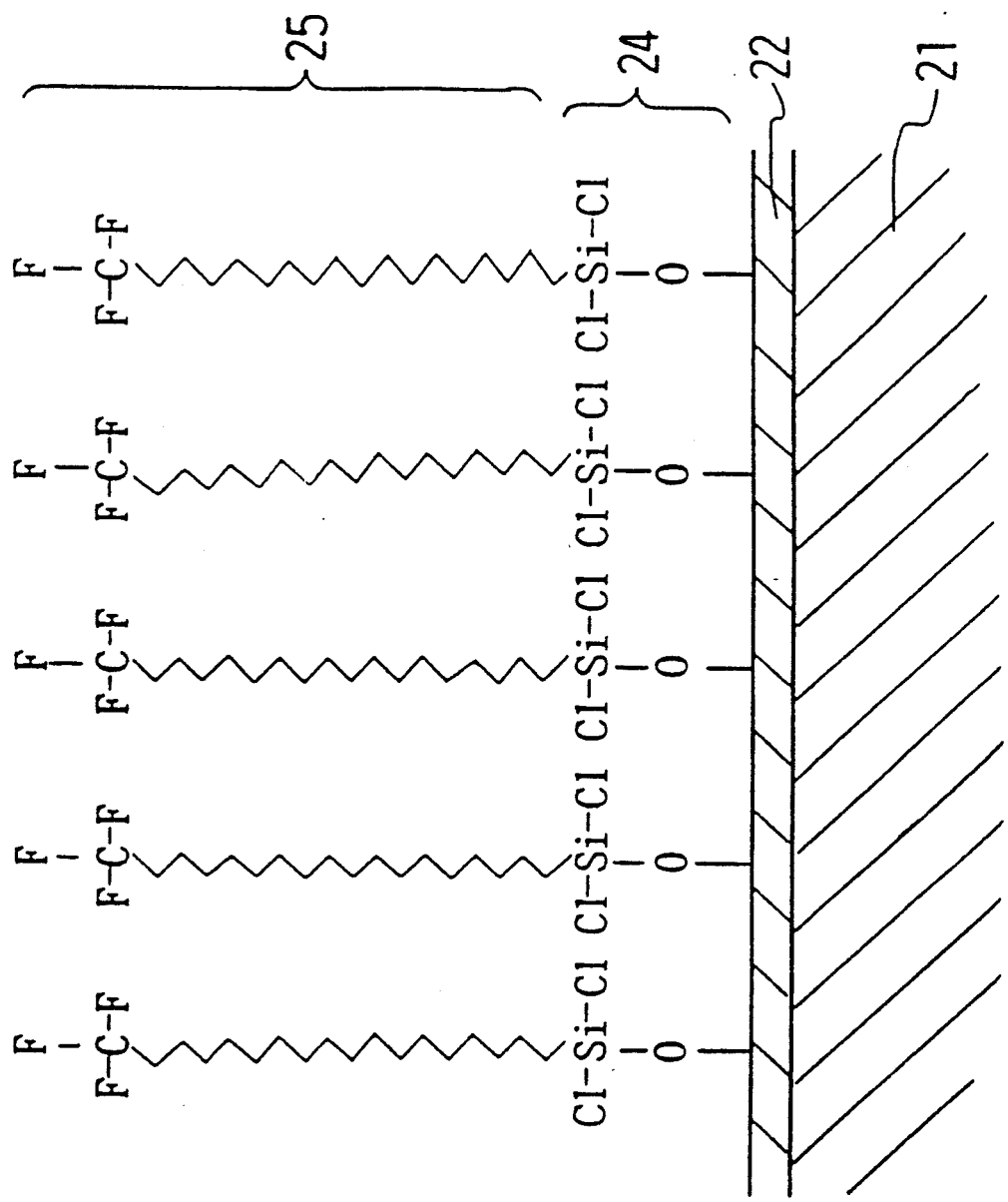
FIG. 10 is a sectional diagram showing an embodiment of the invention at the molecular level, just after the chemical adsorption reaction.
Figure 11:
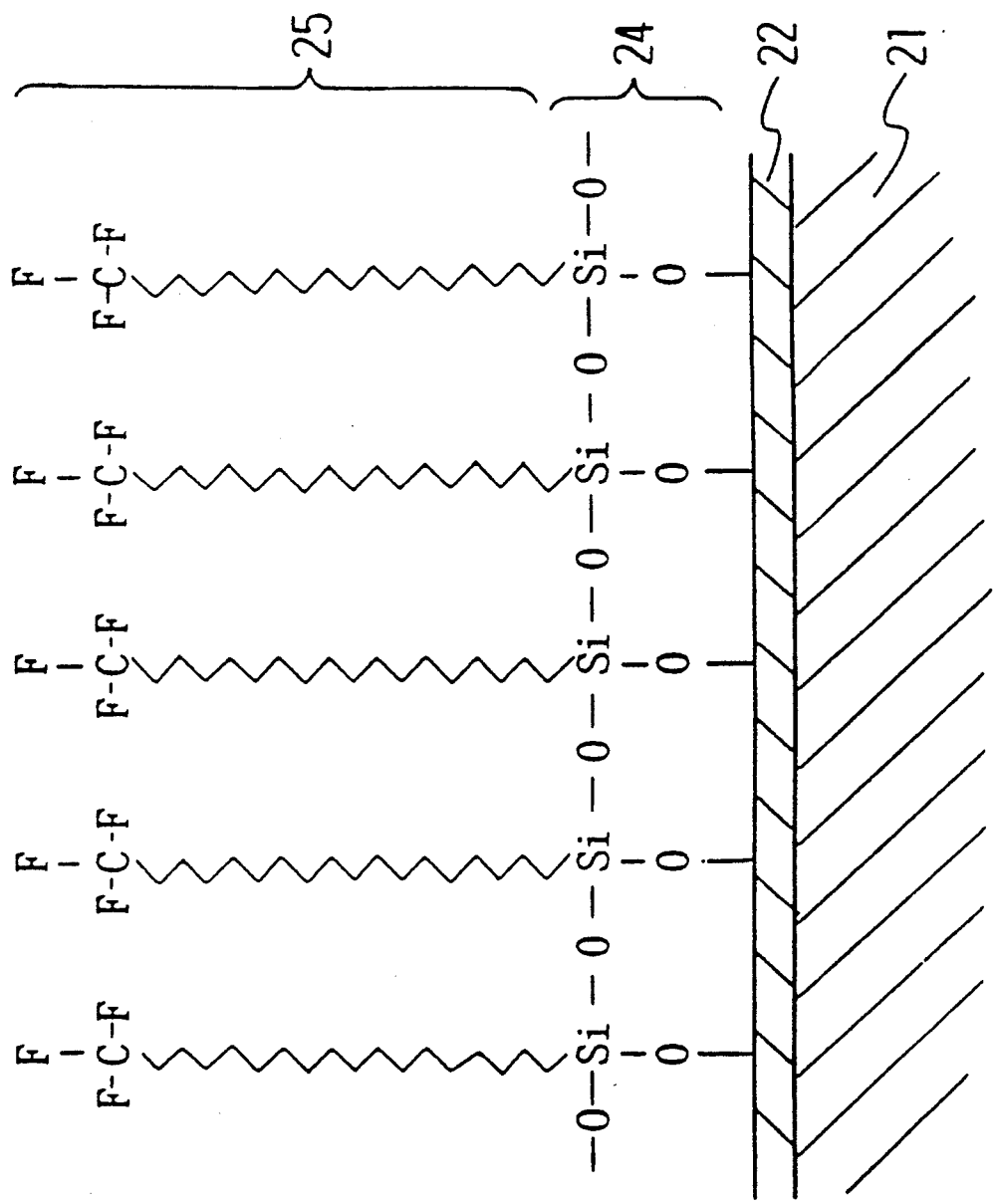
FIG. 11 is a sectional diagram showing an embodiment of the invention at the molecular level, after reacting with moisture.

FIG. 9 through FIG. 11 show a method of manufacturing a recording medium in other embodiment of the invention. In FIGS. 9 to 11, numeral 21 denotes a nonmagnetic substrate, 22 is a ferromagnetic metal thin film layer, 23 is a chlorosilane chemical adsorber, 24 is a siloxane coupling, and 25 is a chemical adsorption film. When the nonmagnetic substrate 21, which forms the ferromagnetic metal thin film layer 22, is exposed to the vapor of the chlorosilane chemical adsorbent 23 (FIG. 9), the hydroxyl groups of the substrate surface and the chlorosilane chemical adsorbent react to dehydrochlorinate. The chemical adsorption film 25 is formed through the siloxane coupling 24 (FIG. 10). When left standing in the air, consequently, it reacts with moisture in the air to form the siloxane coupling 24 also between adsorption molecules (FIG. 11).

Figure 12:
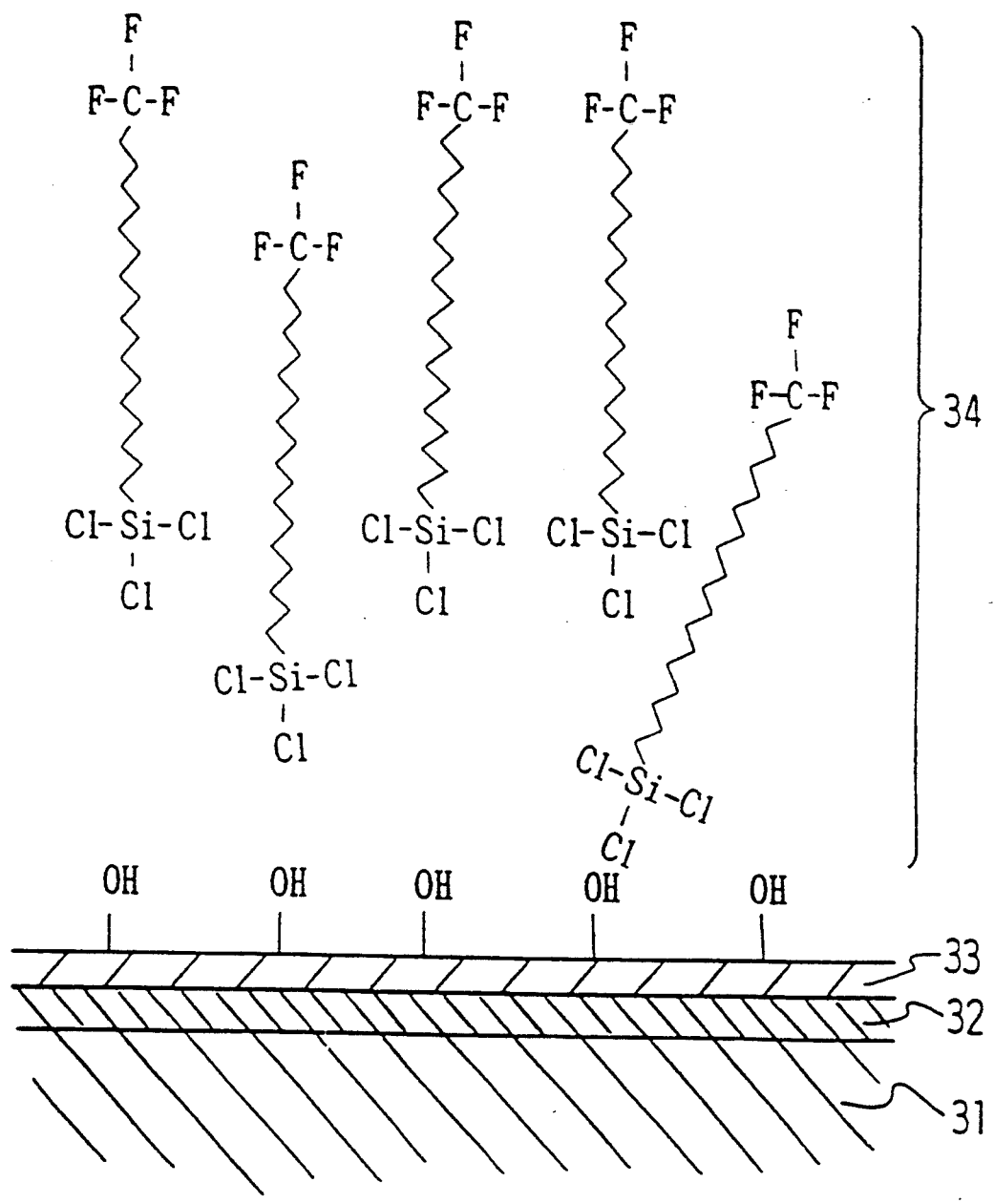
FIG. 12 is a sectional diagram showing an embodiment of the invention at the molecular level, just before the chemical adsorption reaction.
Figure 13:
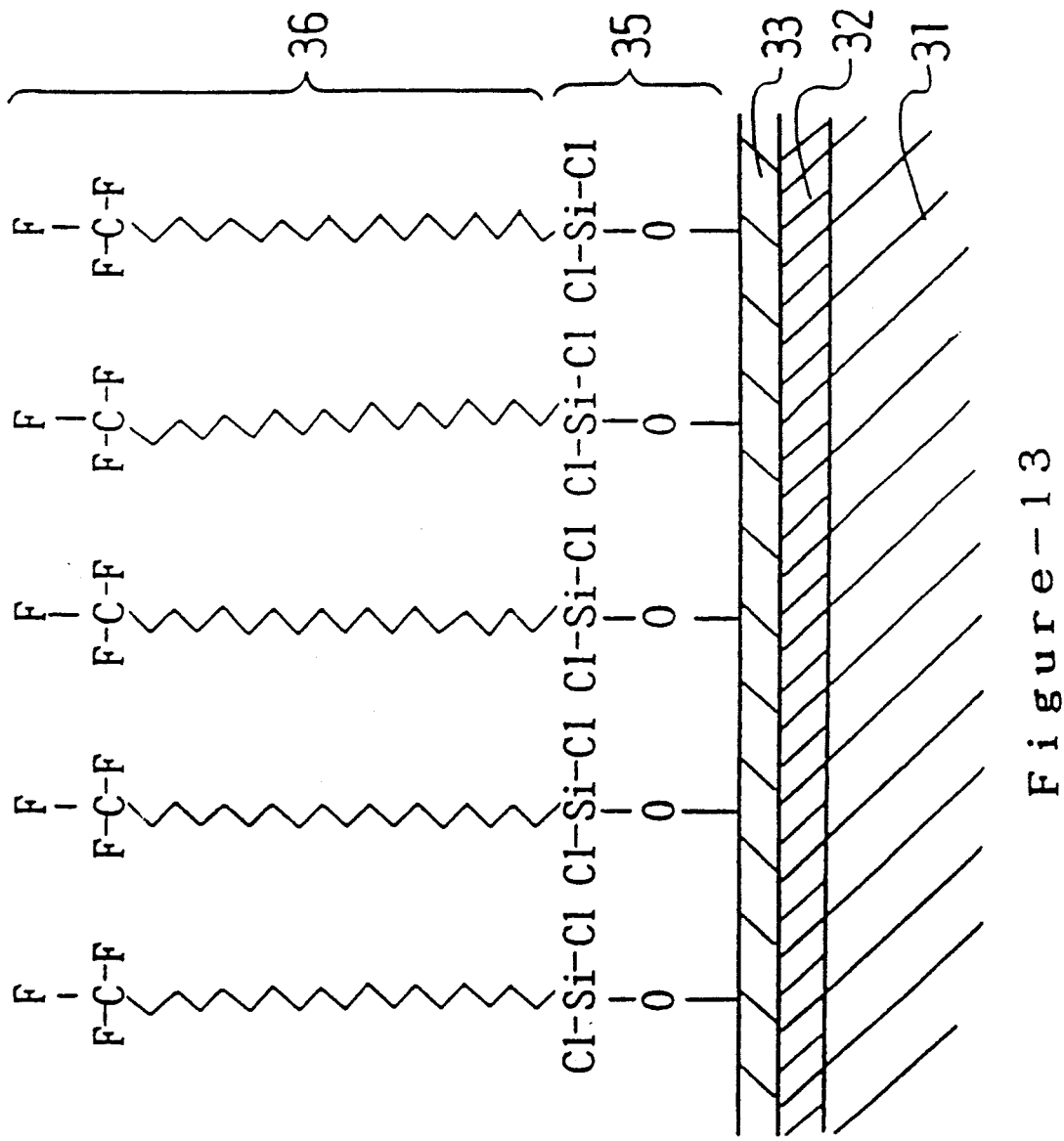
FIG. 13 is a sectional diagram showing an embodiment of the invention at the molecular level, just after the chemical adsorption reaction.
Figure 14:
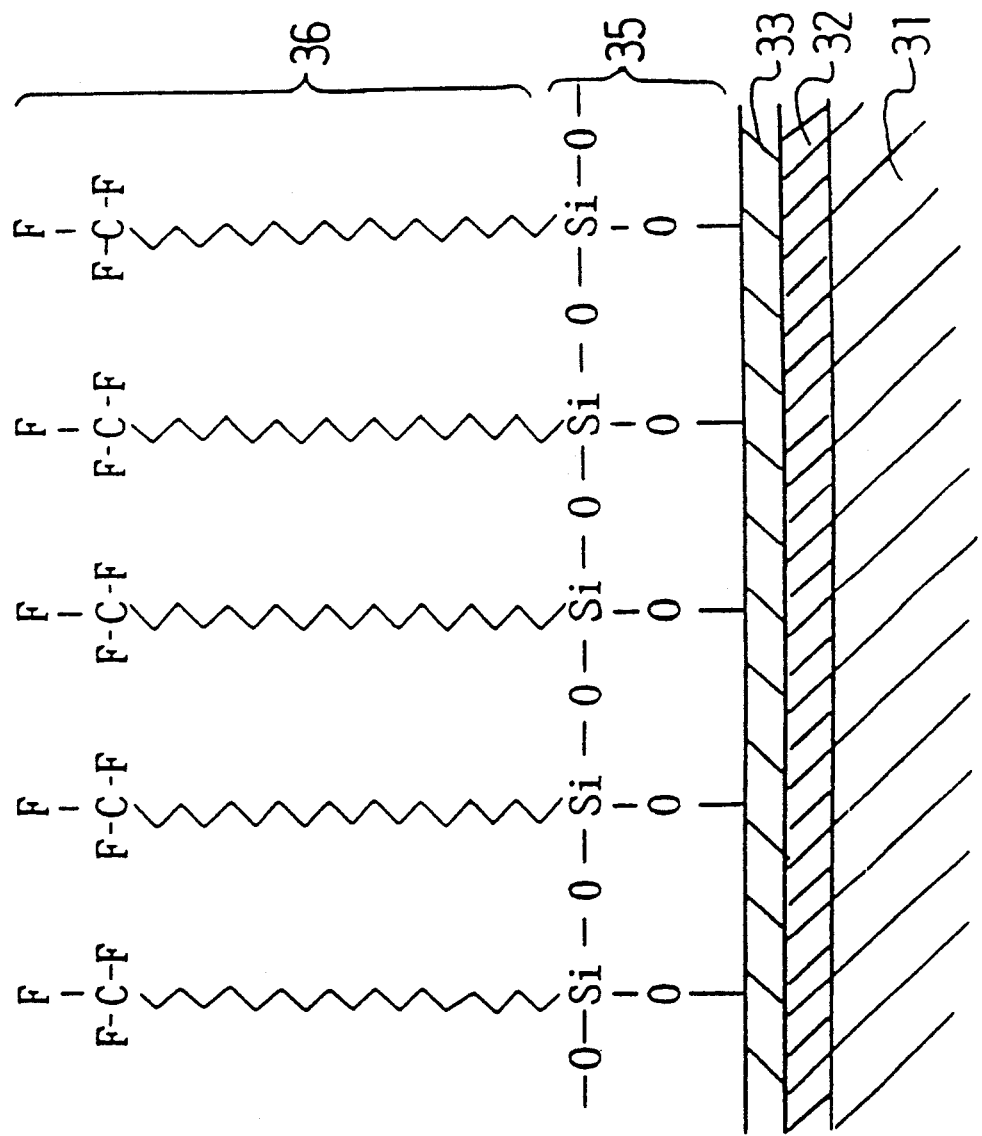
FIG. 14 is a sectional diagram showing an embodiment of the invention at the molecular level, after reacting with moisture.

FIG. 12 through FIG. 14 are sectional views of a recording medium in other embodiment of the invention.

In FIGS. 12 to 14, numeral 31 denotes a nonmagnetic substrate, 32 is a ferromagnetic metal thin film layer, 33 is an inorganic oxide layer, 34 is a chlorosilane chemical adsorber, 35 is a siloxane coupling, and 36 is a chemical adsorption film. When the nonmagnetic substrate 31, which forms the ferromagnetic metal thin film layer 32, is exposed to the vapor of the chlorosilane chemical adsorbent 34, the hydroxyl groups of the substrate surface and the chlorosilane chemical adsorbent react to dehydrochlorinate. The chemical adsorption film 36 is formed through the siloxane coupling 35. When left standing in the air, consequently, it reacts with moisture in the air to form the siloxane coupling 35 also between adsorption molecules.

As the nonmagnetic substrates 21, 31 usable in the magnetic recording medium of the invention, examples include films and plates made of known materials such as polyvinyl chloride, cellulose acetate, polyethylene terephthalate, polyethylene, polypropylene, polycarbonate, polyimide, polyamide, other high polymer materials, nonmagnetic metal materials, glass, porcelain, and other ceramic materials.

As the ferromagnetic materials for forming the ferromagnetic metal thin film layers 22, 23 of the magnetic recording medium of the invention, known materials may be used. For example, alloys of one of more kinds of iron, cobalt and nickel, and their alloys combined with other metals such as manganese, chromium, titanium, phosphorus, yttrium, samarium, and bismuth, or oxides of these metals may be used.

The ferromagnetic metal thin film layers 22, 23 may be formed on the nonmagnetic substrates 21, 31 by any known method, such as by vacuum deposition, sputtering, and plating.

As the inorganic oxide layer 33, $SiO_2$, $TiO_2$, $Al_2O_3$, and others are preferable. In the case of $SiO_2$, since the hydroxyl groups are present at a high density on the surface, the same as in the glass substrate, the chlorosilane chemical adsorbent may be formed at a high density.

The inorganic oxide layer 33 may be formed by a sputtering method, a vacuum deposition method, or other method.

When forming the inorganic oxide 33 on the ferromagnetic metal thin film layer 32 in the invention, the film thickness is preferably 1 to 50 nm. If the film thickness exceeds 50 nm, peeling or cracking is likely to occur. If less than 1 nm, pin holes are likely to be formed, thereby making it hard to form the chemical adsorption film.

EXAMPLE 10

On a 20 μm thick polyimide film substrate, a ferromagnetic metal thin film of 150 nm in film thickness, composed of cobalt (90 wt. %) and chromium (10 wt. %), was formed by a vacuum deposition method. From the substrate forming the ferromagnetic metal thin film, a piece the size of 100 mm×100 mm was cut off, and was exposed for 120 minutes to heptadecafluorodecyl trichlorosilane vapor as the chlorosilane chemical adsorbent containing an alkyl fluoride group in a desiccator. A chemical adsorption monomolecular film 25 was formed on the surface of the ferromagnetic metal thin film layer 22 through a siloxane coupling 24 containing alkyl fluoride groups. The coated substrate was left standing in the air for 60 minutes. A siloxane coupling 24 was formed between the adsorption molecules.

EXAMPLE 11

A coated substrate was formed as in Example 10, except that the heptadecafluorodecyl trichlorosilane was replaced by tridecafluorooctyl trichlorosilane.

EXAMPLE 12

A coated substrate was formed as in Example 10, except that the heptadecafluorodecyl trichlorosilane was replaced by perfluorododecyl trichlorosilane.

EXAMPLE 13

A coated substrate was formed as in Example 10 by using the sample obtained by exposing the substrate forming the ferromagnetic metal thin film for 60 minutes to tetrachlorosilane vapor, and left standing in the air for 60 minutes.

EXAMPLE 14

A coated substrate was formed as in Example 10, except that the heptadecafluorodecyl trichlorosilane was replaced by 19-trimethylsilyl-18-nonadecynyl trichlorosilane. After forming the chemical adsorption film, it was irradiated with 5 megarads of electron beams for 1 minute.

EXAMPLE 15

On a 20 μm thick polyimide film substrate 31, a ferromagnetic metal thin film of 150 nm in film thickness, composed of cobalt (90 wt. %) and chromium (10 wt. %), was formed by vacuum deposition method, and further thereon a $SiO_2$ of 10 nm in film thickness was formed as an inorganic oxide layer 33 by a sputtering method. From the substrate, a piece the size of 100 mm×100 mm was cut off, and was exposed for 120 minutes to heptadecafluorodecyl trichlorosilane vapor as a chlorosilane chemical adsorbent containing alkyl fluoride groups in a desiccator. A chemical adsorption monomolecular film 35 was formed on the inorganic oxide layer 33 through a siloxane coupling 34 containing alkyl fluoride groups. The coated substrate was left standing in the air for 60 minutes. The siloxane coupling 34 was formed between the adsorption molecules.

EXAMPLE 16

A coated substrate was formed as in Example 15, except that the inorganic oxide layer was changed from $SiO_2$ to $TiO_2$.

EXAMPLE 17

A coated substrate was formed as in Example 15, except that the inorganic oxide layer was changed from $SiO_2$ to $Al_2O_3$.

EXAMPLE 18

A coated substrate was formed as in Example 15, except that the step of processing with heptadecafluorodecyl trichlorosilane was preceded by the steps of exposure to tetrachlorosilane vapor for 60 minutes and exposure to air for 60 minutes.

EXAMPLE 19

A coated substrate was formed as in Example 14, except that heptadecafluorodecyl trichlorosilane was replaced by 9-(heptadecafluorodecyldimethylsilyl)-nonyltrichlorosilane.

COMPARATIVE EXAMPLE 6

Instead of the chemical adsorption film in Example 10, a monomolecular film of barium stearate was formed as one layer by the Langmuir-Blodgett method.

The coefficient of dymanic friction of the samples obtained in Examples 10 to 19 and Comparison 6 was measured by a frictional wear coefficient meter (DFPM type of Kyowa Kaimen Kagaku). The head used in the measurement was a steel ball of 3 mm in diameter. The head load was 100 g and head speed was 1.0 mm/s. The results are shown in Table 1.

TABLE 1

| | The coefficient of dymanic friction | |
| --- | --- | --- |
| | Initial | After 200 reciprocal strokes |
| Example 10 | 0.15 | 0.15 |
| Example 11 | 0.14 | 0.14 |
| Example 12 | 0.12 | 0.12 |
| Example 13 | 0.11 | 0.13 |
| Example 14 | 0.19 | 0.19 |
| Example 15 | 0.14 | 0.14 |
| Example 16 | 0.12 | 0.12 |
| Example 17 | 0.11 | 0.11 |
| Example 18 | 0.10 | 0 10 |
| Example 19 | 0.18 | 0.18 |
| Comparative example 6 | 0.25 | 0.54 |

As shown by the data in the table, the recording media in Examples 10 to 19 have a low coefficient of kinematic friction not only in the initial measurement but also after 200 reciprocal strokes, and are superior to the comparison example in lubricity and durability.

In the comparison example, since the bonding of the monomolecular layer of barium stearate and the magnetic layer is weak, it is shaved off by the head. The coefficient of kinematic friction is increased as the reciprocal strokes of the head are increased. Lubricity and durability were not recognized.

When these magnetic recording media were cut in pieces of 75 mm in diameter, and driven on a tester having the same function as the commercial floppy disk, the magnetic recording media of Examples 10 to 19 were stable in running even 100 hours later, and no abrasion injury was observed.

By contrast, the recording medium of the comparison example was unstable in running, and abrasion injuries were noted on the magnetic surface.

The foregoing embodiments relate to magnetic disks, but it is evident that the recording medium of the invention may be applied also to magnetic tape, magnetic cards, etc.

As described herein, according to the embodiments of the invention, the chemical adsorption film formed on the outer surface of the transparent substrate which forms the optical information recording layer is dense. Cracks are hardly formed, and water molecules can scarcely pass through. Moreover, since the chemical adsorption film and the inorganic oxide film or transparent substrate are chemically bonded through a siloxane coupling, peeling hardly occurs, and a moisture proofn quality, corrosion resistance, and durability are excellent. Since the chemical adsorption film is formed in the vapor phase without using an organic solvent, a substrate soluble in an organic solvent can be used. Moreover, since the chemical adsorption film is formed in the vapor phase, entry of contamination into the obtained ultrathin film may be prevented.

In the recording medium of the invention, since the chemical adsorption film bonded by covalent bond is formed on the surface, the lubricity, durability, running performance, and wear resistance are excellent, and these characteristics may be maintained for a long period.

In addition, the water- and moisture-proof properties can be further improved by forming a metal oxide layer on the optical recording layer which is provided on one surface of a transparent substrate. A chemically adsorbed film containing siloxane bonds is provided on the metal oxide layer surface or on the surfaces of both the metal oxide layer and the transparent substrate, thus providing great usefulness in practice. As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A method of manufacturing a recording medium having a recording layer on a surface of a plastic substrate, comprising first depositing the recording layer on the surface of the plastic substrate, then contacting a halogenated silane chemical adsorbent with the recording layer under vapor phase to induce a dehydrochlorination reaction, and reacting the chemical adsorbent with moisture to form a chemical adsorption film.

2. The method of manufacturing a recording medium according to claim 1, wherein the recording medium is an optical information recording medium or a magnetic recording medium.

3. The method of manufacturing a recording medium according to claim 2, wherein a chemical adsorption film is formed under vapor phase on the surface of a transparent plastic substrate to form an optical information recording layer.

4. The method of manufacturing a recording medium according to claim 2, wherein an inorganic oxide layer is formed on the surface of an optical information recording layer which is formed on one side of the plastic substrate, and a chemical adsorption film is formed on the surface of the inorganic oxide layer, or on both surfaces of the inorganic oxide layer and transparent substrate in vapor phase.

5. The method of manufacturing a recording medium according to claim 4, wherein the inorganic oxide film includes at least one layer selected from the group consisting of $SiO_2$, $TiO_2$, and $Al_2O_3$.

6. The method of manufacturing a recording medium according to claim 4, wherein the thickness of the inorganic oxide film is 1 to 500 nm.

7. The method of manufacturing a recording medium according to claim 1, wherein the chemical adsorbent is a compound containing a fluorocarbon group.

8. The method of manufacturing a recording medium according to claim 1, wherein the chemical adsorption film is a monomolecular 9. The method of manufacturing a recording medium according to claim 1, wherein a ferromagnetic metal thin film is disposed on the plastic substrate, and a chemical adsorption film is formed on at least one of the ferromagnetic metal thin film or the back side of the substrate under a vapor phase.

10. The method of manufacturing a recording medium according to claim 1, wherein a ferromagnetic metal thin film is on the plastic substrate, an inorganic oxide layer is formed on the ferromagnetic metal thin film, and a chemical adsorption film is formed on at least one of the inorganic oxide layer or the back side of the substrate under a vapor phase.

11. The method of manufacturing a recording medium according to claim 10, wherein the thickness of the inorganic oxide layer is 1 to 50 nm.

* * * * *